United States Patent
Kumar et al.

(10) Patent No.: US 11,256,577 B2
(45) Date of Patent: Feb. 22, 2022

(54) SELECTIVE SNAPSHOT CREATION USING SOURCE TAGGING OF INPUT-OUTPUT OPERATIONS

(71) Applicant: EMC IP Holding Company LLC, Hopkinton, MA (US)

(72) Inventors: Kundan Kumar, Bangalore (IN); Md Haris Iqbal, Bangalore (IN); Govindaraja Nayaka B, Bangalore (IN); Kurumurthy Gokam, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/888,668

(22) Filed: May 30, 2020

(65) Prior Publication Data

US 2021/0373815 A1 Dec. 2, 2021

(51) Int. Cl.
| | |
|---|---|
| *G06F 12/00* | (2006.01) |
| *G06F 11/14* | (2006.01) |
| *G06F 3/06* | (2006.01) |
| *G06F 9/455* | (2018.01) |

(52) U.S. Cl.
CPC ........ *G06F 11/1461* (2013.01); *G06F 3/0611* (2013.01); *G06F 3/0619* (2013.01); *G06F 3/0659* (2013.01); *G06F 3/0664* (2013.01); *G06F 3/0673* (2013.01); *G06F 9/45558* (2013.01); *G06F 11/1451* (2013.01); *G06F 11/1469* (2013.01); *G06F 2009/45591* (2013.01)

(58) Field of Classification Search
None
See application file for complete search history.

(56) References Cited

U.S. PATENT DOCUMENTS

| | | |
|---|---|---|
| 7,908,436 B1 | 3/2011 | Srinivasan |
| 8,423,733 B1 | 4/2013 | Ozdemir et al. |
| 8,954,383 B1 | 2/2015 | Vempati et al. |

(Continued)

OTHER PUBLICATIONS

G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.

(Continued)

*Primary Examiner* — Daniel D Tsui
(74) *Attorney, Agent, or Firm* — Ryan, Mason & Lewis, LLP

(57) ABSTRACT

Techniques are provided for selective snapshot creation using source tagging of input-output (I/O) operations. One method comprises receiving an I/O operation; obtaining an I/O tag associated with the I/O operation indicating a source of the I/O operation (e.g., a source application or a source virtual machine); updating a cumulative I/O tag value associated with the I/O tag that indicates an amount of activity associated with the I/O tag; and initiating a snapshot of at least a portion of a storage system that stores data associated with the I/O operation in response to the cumulative I/O tag value satisfying a corresponding threshold value. A source device associated with the I/O operation may associate the I/O tag with the I/O operation and send the I/O operation with the I/O tag to the storage system.

20 Claims, 9 Drawing Sheets

(56) References Cited

U.S. PATENT DOCUMENTS

| | | |
|---|---|---|
| 9,003,227 B1 | 4/2015 | Patel et al. |
| 9,104,675 B1 | 8/2015 | Clark et al. |
| 9,390,116 B1 | 7/2016 | Li |
| 9,569,357 B1 | 2/2017 | Shalev |
| 9,778,996 B1 | 10/2017 | Bono et al. |
| 9,836,243 B1 | 12/2017 | Chanler et al. |
| 10,210,048 B2 | 2/2019 | Sancheti |
| 10,474,367 B1 | 11/2019 | Mallick et al. |
| 11,068,199 B2 | 7/2021 | Shveidel et al. |
| 2010/0211616 A1 | 8/2010 | Khandelwal |
| 2011/0307447 A1 | 12/2011 | Sabaa et al. |
| 2014/0244935 A1 | 8/2014 | Ezra et al. |
| 2014/0310499 A1 | 10/2014 | Sundararaman et al. |
| 2015/0127618 A1 | 5/2015 | Alberti et al. |
| 2015/0317326 A1 | 11/2015 | Bandarupalli et al. |
| 2016/0070652 A1 | 3/2016 | Sundararaman et al. |
| 2016/0077746 A1 | 3/2016 | Muth et al. |
| 2016/0092677 A1* | 3/2016 | Patel ................... G06F 9/468 726/23 |
| 2017/0052717 A1 | 2/2017 | Rawat et al. |
| 2017/0277709 A1 | 9/2017 | Strauss et al. |
| 2018/0285198 A1 | 10/2018 | Dantkale et al. |
| 2018/0307609 A1 | 10/2018 | Qiang et al. |
| 2018/0341513 A1* | 11/2018 | Davies .................... G06F 9/461 |
| 2019/0042134 A1 | 2/2019 | Nishizono |
| 2020/0019620 A1 | 1/2020 | Sarda et al. |
| 2020/0034308 A1 | 1/2020 | Shveidel et al. |
| 2020/0065399 A1 | 2/2020 | Desai et al. |
| 2020/0065408 A1 | 2/2020 | Desai et al. |
| 2020/0133541 A1 | 4/2020 | Kleiner et al. |
| 2020/0226035 A1 | 7/2020 | Li et al. |
| 2020/0241793 A1 | 7/2020 | Shveidel et al. |
| 2020/0311025 A1 | 10/2020 | Singh et al. |

OTHER PUBLICATIONS

NVM Express, "NVM Express, Revision 1.3," NVM Express, May 1, 2017, 282 pages.

Commvault, "Storage Policy (Snapshot)" https://documentation.commvault.com/commvault/v11/article?p=60105_1.htm, Sep. 12, 2019, 3 pages.

Oracle, "Managing Snapshots," https://docs.cloud.oracle.com/en-us/iaas/Content/File/Tasks/managingsnapshots.htm, 2020, 3 pages.

U.S. Appl. No. 16/861,986 filed in the name of Vladimir Shveidel et al. filed Apr. 29, 2020, and entitled "Lockless Metadata Binary Tree Access."

U.S. Appl. No. 16/862,733 filed in the name of Alexander S. Mathews et al. filed Apr. 30, 2020, and entitled "Finding Storage Objects of a Snapshot Group Pointing to a Logical Page in a Logical Address Space of a Storage System."

U.S. Appl. No. 16/862,735 filed in the name of Dixitkumar Vishnubhai Patel et al. filed Apr. 30, 2020, and entitled "Mapping Virtual Block Addresses to Portions of a Logical Address Space that Point to the Virtual Block Addresses."

U.S. Appl. No. 16/862,740 filed in the name of Rohit K. Chawla et al. filed Apr. 30, 2020, and entitled "Generating Recommendations for Initiating Recovery of a Fault Domain Representing Logical Address Space of a Storage System."

U.S. Appl. No. 16/863,433 filed in the name of Sorin Faibish et al. filed Apr. 30, 2020, and entitled "Cache Retention for Inline Deduplication Based on Number of Physical Blocks with Common Fingerprints Among Multiple Cache Entries."

U.S. Appl. No. 16/879,459 filed in the name of Yousheng Liu et al. filed May 20, 2020, and entitled "Reusing Overwritten Portion of Write Buffer of a Storage System."

U.S. Appl. No. 16/897,388 filed in the name of Alex Soukhman et al. filed Jun. 10, 2020, and entitled "Garbage Collection in a Storage System at Sub-Virtual Block Granularity Level."

U.S. Appl. No. 16/907,560 filed in the name of Vamsi K. Vankamamidi et al. filed Jun. 22, 2020, and entitled "Regulating Storage Device Rebuild Rate in a Storage System."

U.S. Appl. No. 16/916,219 filed in the name of Vladimir Kleiner et al. filed Jun. 30, 2020, and entitled "Application Execution Path Tracing for Inline Performance Analysis."

U.S. Appl. No. 16/916,621 filed in the name of Dixitkumar Vishnubhai Patel et al. filed Jun. 30, 2020, and entitled "Reconstruction of Logical Pages in a Storage System."

U.S. Appl. No. 16/916,763 filed in the name of Dixitkumar Vishnubhai Patel et al. filed Jun. 30, 2020, and entitled "Reconstruction of Links between Logical Pages in a Storage System."

U.S. Appl. No. 16/917,090 filed in the name of Dixitkumar Vishnubhai Patel et al. filed Jun. 30, 2020, and entitled "Reconstruction of Links to Orphaned Logical Pages in a Storage System."

U.S. Appl. No. 16/938,272 filed in the name of Xiangping Chen et al. filed Jul. 24, 2020, and entitled "Efficient Token Management in a Storage System."

https://documentation.commvault.com/commvault/v11/article?p=60105_1.htm, downloaded on May 27, 2020.

https://docs.cloud.oracle.com/en-US/iaas/Content/File/Tasks/managingsnapshots.htm, downloaded on May 27, 2020.

U.S. Appl. No. 16/260,660, filed Jan. 29, 2019 entitled, "System and Method for Aggregating Metadata Changes in a Storage System."

* cited by examiner

| APPLICATION NAME | I/O TAG | CRITICALITY |
|---|---|---|
| APPLICATION A | 5 | 2 |
| APPLICATION B | 1 | 3 |
| ... | ... | ... |
| APPLICATION Q | 3 | 1 |

| VM UUID | I/O TAG | CRITICALITY |
|---|---|---|
| VM UUID1 | 1 | 2 |
| VM UUID2 | 2 | 3 |
| ... | ... | ... |
| VM UUIDR | 3 | 1 |

FIG. 4

SERVER-SIDE I/O TAGGING PROCESS 600

RECEIVE I/O OPERATION FROM APPLICATION 112 OR VIRTUAL MACHINE 210

USE SOURCE-TO-I/O TAG MAPPING TABLE 118 TO OBTAIN I/O TAG FOR APPLICATION 112 OR VIRTUAL MACHINE 210

EMBED I/O TAG INTO I/O OPERATION BASED ON SOURCE OF I/O OPERATION

SEND TAGGED I/O OPERATION TO STORAGE SYSTEM 102

FIG. 6A

STORAGE-SIDE I/O TAG PROCESSING ROUTINE 650

RECEIVE I/O OPERATION FROM HOST DEVICE 101-1

OBTAIN I/O TAG AND AMOUNT OF DATA BEING WRITTEN FROM I/O OPERATION

UPDATE CUMULATIVE I/O TAG VALUE IN I/O TAG TABLE 500

WHEN CUMULATIVE I/O TAG VALUE SATISFIES THRESHOLD VALUE IN STORAGE-SIDE I/O TAG DATA STRUCTURE 500:

TRIGGER SNAPSHOT; AND
RESET CUMULATIVE VALUE

FIG. 6B

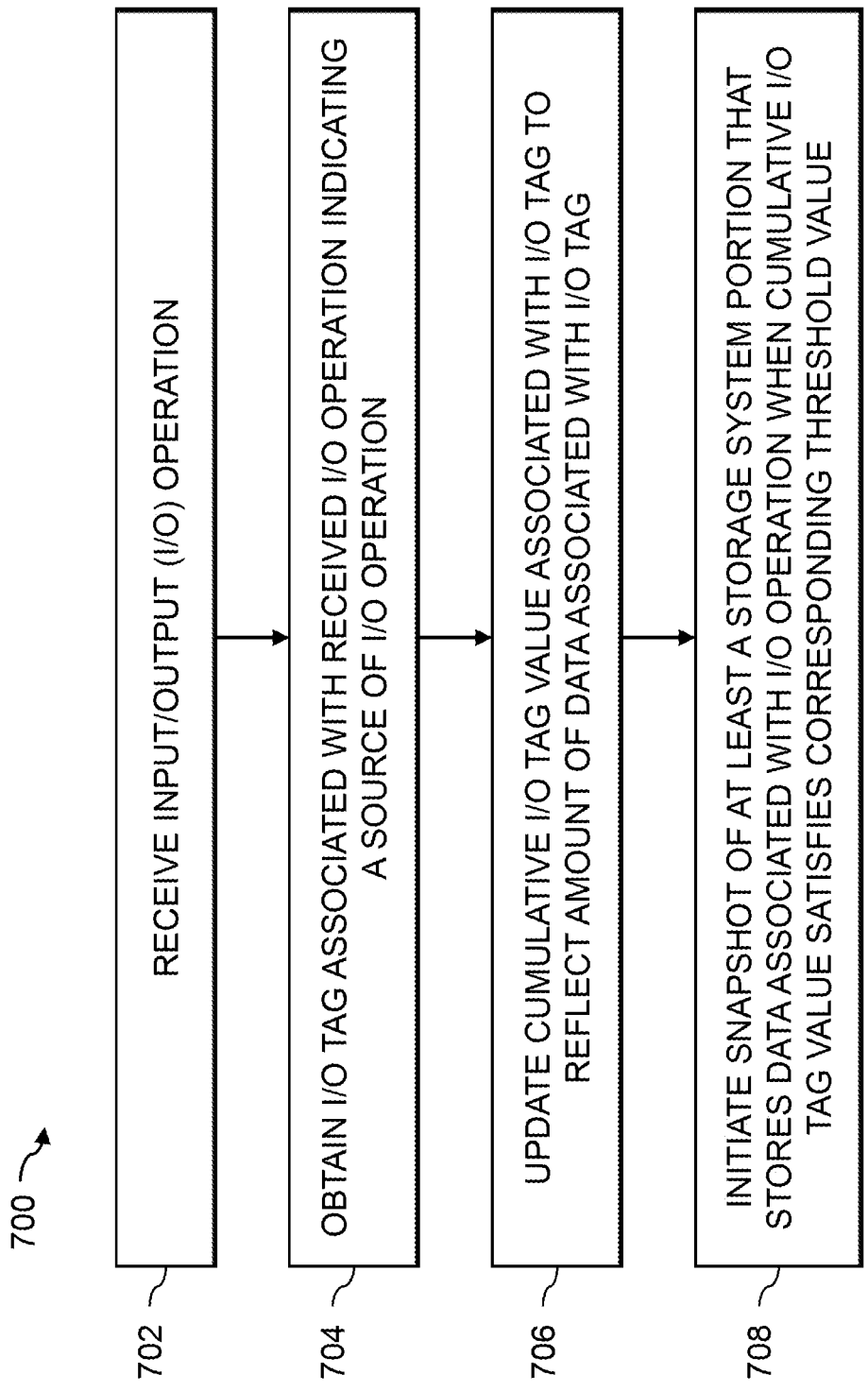

SELECTIVE SNAPSHOT CREATION USING SOURCE TAGGING OF INPUT-OUTPUT OPERATIONS

FIELD

The field relates generally to information processing techniques and more particularly, to techniques for protecting information.

BACKGROUND

Snapshots are utilized by information processing systems to save a state of a storage system at a given point in time. A user typically specifies when a snapshot of one or more target logical volumes is created, using a technique that is sometimes referred to as snapshot scheduling. When snapshot scheduling is used, however, a new snapshot is created according to the schedule even if the data stored on the storage system has not changed significantly since the previous snapshot.

Such a snapshot may result in reduced storage system performance and wasted storage system processing and/or storage resources which could otherwise have been utilized by the storage system for processing new input-output (I/O) operations.

A need exists for improved techniques for creating snapshots.

SUMMARY

In one embodiment, a method comprises receiving an I/O operation; obtaining an I/O tag associated with the I/O operation indicating a source of the I/O operation (e.g., a source application or a source virtual machine); updating a cumulative I/O tag value associated with the I/O tag that indicates an amount of activity associated with the I/O tag; and initiating a snapshot of at least a portion of a storage system that stores data associated with the I/O operation in response to the cumulative I/O tag value satisfying a corresponding threshold value.

In some embodiments, the amount of activity associated with the I/O tag indicates one or more of a cumulative sum of an amount of data associated with at least some of the I/O operations having the I/O tag and a cumulative number of at least some of the I/O operations having the I/O tag. A source device associated with the I/O operation may associate the I/O tag with the I/O operation and send the I/O operation with the I/O tag to the storage system.

Other illustrative embodiments include, without limitation, apparatus, systems, methods and computer program products comprising processor-readable storage media.

BRIEF DESCRIPTION OF THE DRAWINGS

FIGS. 3 and 4 illustrate the source-to-I/O tag mapping table of FIG. 1, according to one or more embodiments of the disclosure;

FIG. 6A illustrates exemplary pseudo code for a server-side I/O tagging process, according to at least some embodiments;

FIG. 6B illustrates exemplary pseudo code for a storage-side I/O tag processing routine, according to at least some embodiments;

FIG. 7 is a flow chart illustrating an exemplary implementation of a snapshot creation process that uses source tagging of I/O operations, according to an exemplary embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for selective snapshot creation using source tagging of I/O operations. For example, the source tagging may identify a source application or a virtual machine associated with each I/O operation.

As noted above, snapshot scheduling specifies when a snapshot of one or more target logical volumes is automatically created. Snapshot scheduling, however, does not take into account how much data is being written to the storage system or how much data has changed in the storage system. For example, if one or more host devices are very active between scheduled snapshots and submit I/O operations that write large amounts of data to the storage system, there is a potential to lose that data if the storage system waits until a scheduled time to take a snapshot.

In addition, the same snapshot treatment is typically applied to all applications for a snapshot schedule, even if the data associated with some of the applications has not changed since the last snapshot. This may result in reduced storage system performance and wasted storage system processing and storage resources when a snapshot is taken of data associated with an application where such a snapshot is not needed.

Illustrative embodiments provide functionality for overcoming these drawbacks of snapshot scheduling and other snapshot techniques by utilizing the disclosed I/O tag-based snapshot techniques. In one or more embodiments of an information processing system that utilizes the disclosed I/O tagging techniques, I/O operations submitted to the storage system include a unique identifier (ID), also referred to herein as an I/O tag, that provides an indication to the storage system of which source application or virtual machine (VM) submitted the respective I/O operations.

For example, a host device (e.g., a server) in such an information processing system may be configured to tag each I/O operation to be submitted to the storage system with a unique I/O tag that corresponds to the application or VM that issued that I/O operation. For example, the I/O tag may be added to the I/O operation as part of its packet header or any other part of the communication comprising or associated with the I/O operation. In some embodiments, a multipath input-output (MPIO) driver of the host device may perform the I/O tagging.

Figure 1:
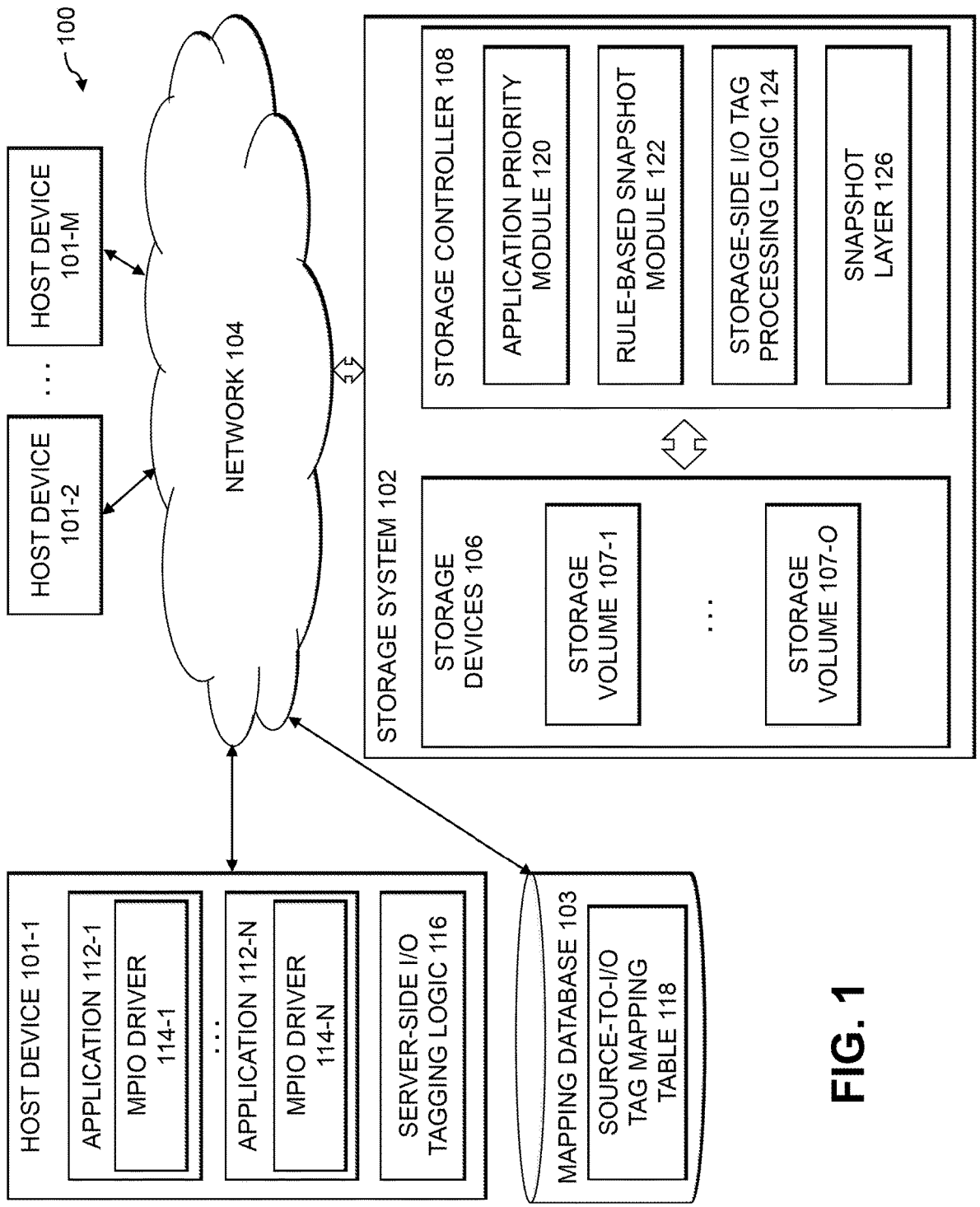
FIG. 1 shows an information processing system 100 configured for selective snapshot creation using source tagging of I/O operations, in accordance with an illustrative embodiment.

FIG. 1 shows an information processing system 100 configured in accordance with an illustrative embodiment. The information processing system 100 comprises a plurality of host devices 101-1, 101-2, . . . 101-M, collectively referred to herein as host devices 101, and a storage system 102. The host devices 101 are configured to communicate with the storage system 102 over a network 104. The host devices 101 illustratively comprise servers or other types of computers of an enterprise computer system, cloud-based computer system or other arrangement of multiple compute nodes associated with respective users. Host device 101-1 is representative of one or more of the host devices 101.

For example, the host devices 101 in some embodiments illustratively provide compute services such as execution of one or more applications on behalf of each of one or more users associated with respective ones of the host devices. Such applications illustratively generate I/O operations that are processed by the storage system 102. The term "input-output" as used herein refers to at least one of input and output. For example, I/O operations may comprise write requests and/or read requests directed to logical addresses of a particular logical storage volume of the storage system 102. These and other types of I/O operations are also generally referred to herein as I/O requests.

As shown in FIG. 1, the representative host device 101-1 executes one or more applications 112-1 through 112-N, collectively referred to herein as applications 112. Each exemplary application 112 comprises an MPIO driver 114 configured to control delivery of I/O operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The host devices 101 and/or applications 112 are configured to interact over the network 104 with the storage system 102. Such interaction illustratively includes generating I/O operations, such as write and read requests, and sending such requests over the network 104 for processing by the storage system 102. As discussed hereinafter, the MPIO driver 114 associated with each application 112 provides I/O tagged I/O operations to the storage system 102. The MPIO driver 114 may comprise, for example, an otherwise conventional MPIO driver, such as a PowerPath® driver from Dell EMC. Other types of MPIO drivers from other driver vendors may be used.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The storage system 102 comprises a plurality of storage devices 106 and an associated storage controller 108. The storage devices 106 store data of a plurality of storage volumes 107-1 through 107-0. The storage volumes 107 illustratively comprise respective logical units (LUNs) or other types of logical storage volumes. The term "storage volume" as used herein is intended to be broadly construed, and should not be viewed as being limited to any particular format or configuration.

Functionality snapshot creation using source tagging of I/O operations in the storage system 102 are illustratively performed at least in part by the storage controller 108, in a manner to be described in more detail elsewhere herein. In the example of FIG. 1, the exemplary storage controller 108 comprises an application priority module 120, a rule-based snapshot module 122, storage-side I/O tag processing logic 124 and a snapshot layer 126. In some embodiments, the application priority module 120 manages a priority or criticality of the applications 112, as discussed further below in conjunction with FIG. 4. The rule-based snapshot module 122 determines when to take snapshots based on the I/O tagging, as discussed hereinafter. The exemplary storage-side I/O tag processing logic 124 processes the received I/O tags and maintains cumulative tag values in some embodiments that are used to trigger a snapshot scheduling when a corresponding threshold is satisfied. Once a snapshot is triggered using the disclosed I/O tagging techniques, the snapshot layer 126 implements the snapshot, for example, in a conventional manner.

The storage controller 108 and the storage system 102 may further include one or more additional modules and other components typically found in conventional implementations of storage controllers and storage systems, although such additional modules and other components are omitted from the figure for clarity and simplicity of illustration.

Additionally, the host devices 101 and/or the storage system 102 can have an associated mapping database 103 configured to store a source-to-I/O tag mapping table 118 that indicates, for each I/O tag, a corresponding source application or virtual machine, as discussed further below in conjunction with FIGS. 3 and 4. The source-to-I/O tag mapping table 118 in the present embodiment can be implemented using one or more storage systems associated with the host devices 101 and/or the storage system 102, or the source-to-I/O tag mapping table 118 can be stored in the mapping database 103 and accessed over the network. Such storage systems can comprise any of a variety of different types of storage including network-attached storage (NAS), storage area networks (SANs), direct-attached storage (DAS) and distributed DAS, as well as combinations of these and other storage types, including software-defined storage.

The host devices 101 and the storage system 102 may be implemented on a common processing platform, or on separate processing platforms. The host devices 101 are illustratively configured to write data to and read data from the storage system 102 in accordance with applications 112 executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell EMC of Hopkinton, Mass. A wide variety of other types of distributed or non-distributed storage arrays can be used in implementing the storage system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement I/O operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and/or storage system 102 in illustrative embodiments will be described in more detail below in conjunction with FIGS. 8 and 9.

It is to be appreciated that these and other features of illustrative embodiments are presented by way of example only, and should not be construed as limiting in any way.

Accordingly, different numbers, types and arrangements of system components such as host devices 101, server-side I/O tagging logic 116, storage system 102, network 104, storage devices 106, storage volumes 107, storage controller 108, application priority module 120, rule-based snapshot module 122, storage-side I/O tag processing logic 124 and snapshot layer 126 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing server-side I/O tagging logic 116 will be described in more detail with reference to FIG. 6A. An exemplary process utilizing application priority module 120, rule-based snapshot module 122, storage-side I/O tag processing logic 124 and/or snapshot layer 126 will be described in more detail with reference to FIG. 6B.

A converged infrastructure or an application cluster, which uses, for example, NAS or SANs, can run a large number and variety of applications. Each of these applications can have different levels of importance or criticality in the application cluster. In these situations, applications may be served by storage solutions in the backend (such as, for example ScaleIO™) which is accessed by the cluster nodes over SAN or NAS. When an application running on a cluster accesses a file, the file access delay on the storage array directly affects application performance. In these situations, recently accessed data may be cached in order to give quick repeat access to the same data.

Figure 2:
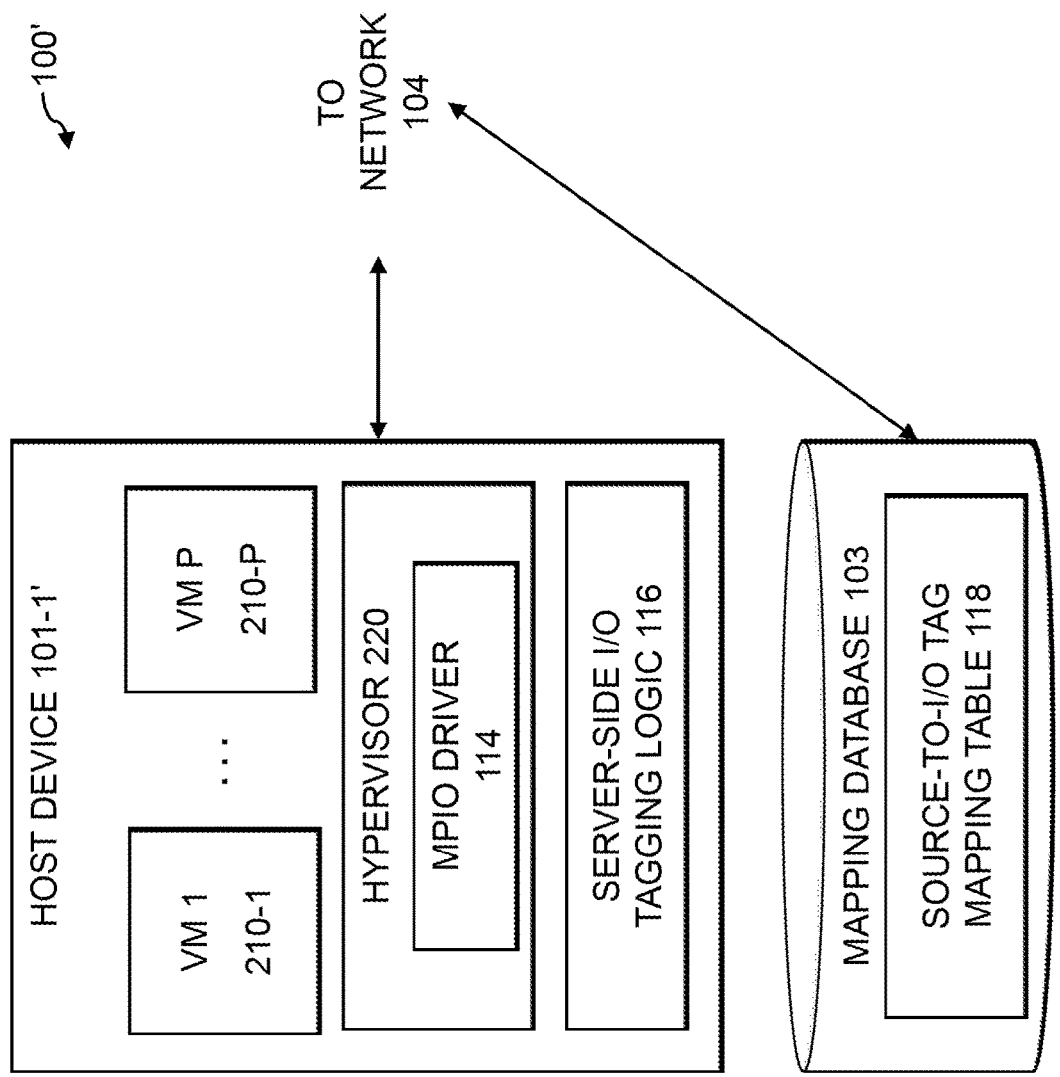
FIG. 2 illustrates a variation of a portion of the information processing system of FIG. 1, according to some embodiments of the disclosure.

FIG. 2 illustrates a variation 100' of a portion of the information processing system 100 of FIG. 1, according to some embodiments of the disclosure. In the example of FIG. 2, the representative host device 101-1' comprises a server running multiple virtual machines 210-1 through 210-P through a hypervisor 220. The hypervisor 220 comprises the MPIO driver 114 of FIG. 1 that is configured to control delivery of I/O operations with I/O tagging from the host device 101 to the storage system 102 over selected ones of a plurality of paths through the network 104, as described above. The other elements of FIG. 2 are implemented in a similar manner as the embodiment of FIG. 1, as would be apparent to a person of ordinary skill in the art.

In the example of FIG. 2, the mapping database 103 comprises a source-to-I/O tag mapping table 118 that identifies, for example, a virtual machine associated with each I/O operation, as discussed further below in conjunction with FIG. 4.

FIG. 3 is a sample table 300 of an implementation of the source-to-I/O tag mapping table 118 to maintain the I/O tags corresponding to each of the applications 112 of FIG. 1, according to one or more embodiments of the disclosure. In the embodiment of FIG. 3, the application names are mapped to the corresponding I/O tag via the source-to-I/O tag mapping table 118. The exemplary source-to-I/O tag mapping table 118 may also map a criticality (or priority) to each application name and I/O tag, as shown in FIG. 3. In further variations described herein, not shown in FIG. 3, the source-to-I/O tag mapping table 118 may also indicate an application type and/or a snapshot threshold for one or more of the applications 112.

FIG. 4 is a sample table 400 of an implementation of the source-to-I/O tag mapping table 118 to maintain the I/O tags corresponding to each of the virtual machines 210 of FIG. 2, according to some embodiments. In the embodiment of FIG. 4, the UUID (universally unique identifier) of each virtual machine 210 is mapped to the corresponding I/O tag via the source-to-I/O tag mapping table 118. The exemplary source-to-I/O tag mapping table 118 may also map a criticality (or priority) to each application name and I/O tag, as shown in FIG. 4. In further variations described herein, not shown in FIG. 4, the source-to-I/O tag mapping table 118 may also indicate a virtual machine type and/or a snapshot threshold for one or more of the virtual machines 210.

While the exemplary tables 300, 400 of FIGS. 3 and 4 are described above as separate tables, in some embodiments both application names and virtual machine UUIDs may be mapped to I/O tags and criticalities in the same table, as would be apparent to a person of ordinary skill in the art.

An I/O tag may be generated and provided to the host devices 101 and/or storage system 102 in a variety of ways. In one example, the host device 101 may obtain the application name for the application 112 issuing an I/O operation. For example, in a Linux operating system, a Struct task_struct→comm can be fetched for each I/O operation in the I/O path to obtain the application name, either by an independent module or by the MPIO driver 114. In another example, for an ESX operating system, the VM UUID may be fetched using the specific VMkernel API such as, e.g., vmk_ScsiCmdGetVMUuido().

For each obtained application name or virtual machine UUID, the server-side I/O tagging logic 116 may generate an I/O tag, as described above. In illustrative embodiments, each application 112 or virtual machine 210 will be associated with its own unique I/O tag.

As noted above, the MPIO driver 114 associated with each application 112 or virtual machine 210 provides I/O tagged I/O operations to the storage system 102 by accessing the corresponding I/O tags from the source-to-I/O tag mapping table 118 of tables 300 and/or 400. Likewise, the storage-side I/O tag processing logic 124 locates an entry in the tables 300 and/or 400 corresponding to the obtained I/O tag in a storage-side I/O tag data structure discussed hereinafter in conjunction with FIG. 5 to track an amount of data written by the corresponding source application or virtual machine (e.g., as a number of bytes and/or a number of I/O operations) and to obtain a snapshot threshold for the corresponding source.

Figure 5:
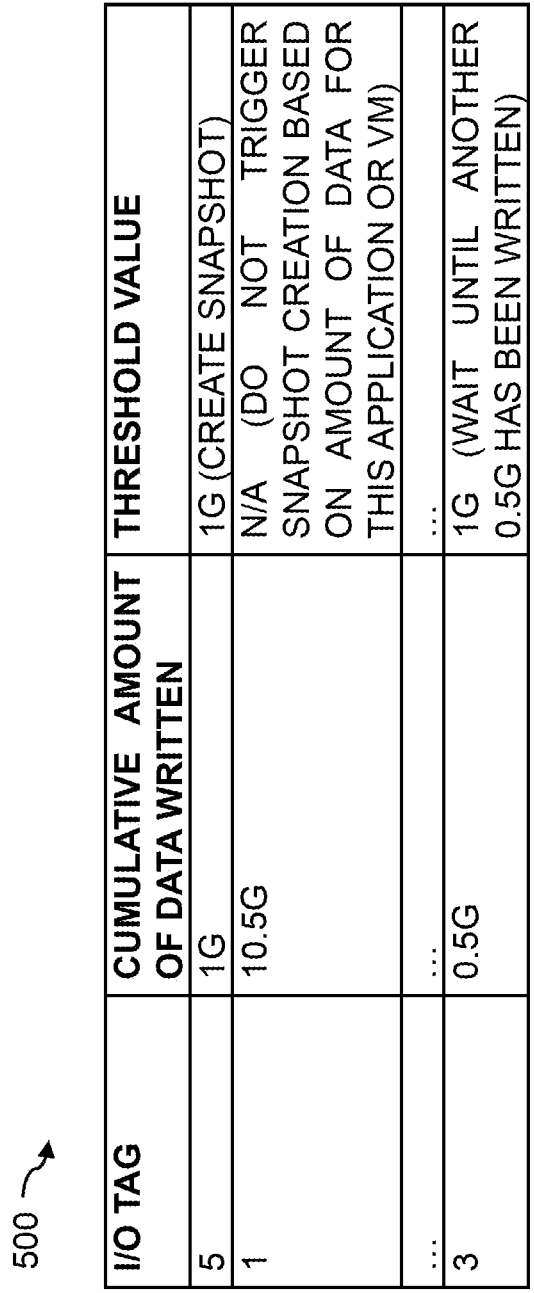
FIG. 5 is a sample table of a storage-side I/O tag data structure that maintains information for each I/O tag, according to an embodiment.

FIG. 5 is a sample table 500 of a storage-side I/O tag data structure that maintains the amount of data written, and the corresponding threshold for I/O operations for each I/O tag, according to an embodiment. In the embodiment of FIG. 5, the amount of data written for each I/O tag is recorded as a byte-counter, but in further variations, the amount of data written can be approximated by tracking a number of I/O operations associated with each I/O tag.

The storage system 102 may obtain the threshold value indicated in the exemplary storage-side I/O tag data structure, e.g., via a user input on the storage system 102, from the host device 101 or in another manner. The data structure of FIG. 5 is used by the snapshot layer 126 of the storage system 102 to determine when to create snapshots based on the amount of data in the amount of data field of FIG. 5 for a given I/O tag and the corresponding threshold value for the I/O tag, as described above. If no entry is present in the storage-side I/O tag data structure of FIG. 5 for a given I/O tag, a new entry may be added for the new I/O tag. In some embodiments, the exemplary storage-side I/O tag data structure of FIG. 5 may also map the I/O tag to any corresponding logical volumes that contain data associated with the corresponding application or virtual machine.

In some embodiments, the mapping between an I/O tag and the associated source application or virtual machine is provided to the storage system 102 prior to, or in conjunction with, the submission of the I/O operation comprising the I/O tag. The mapping may be provided to the storage system 102 using in-band or out-of-band communication links where in-band refers to communications utilizing the data path between the host device 101 and storage system 102 that services I/O operations and out-of-band refers to communications utilizing other communication links that are not part of the data path. As an example, SCSI or NVMe commands or protocols may be utilized for in-band communications and REST (representational state transfer) protocols may be utilized for out-of-band communications. Any other communication protocols may be utilized for either in-band or out-of-band communications between the host device and storage system, as would be apparent to a person of ordinary skill in the art.

The threshold value shown in FIG. 5 for triggering the snapshot may be obtained by the storage system 102 in any of the manners described above. In some embodiments, the storage system 102 may also obtain an indication of whether the snapshots triggered by the threshold value are application or virtual machine specific snapshots or a snapshot for a larger portion of the storage system 102 up to and including a full storage system snapshot, e.g., in a similar manner to the threshold value as described above. For example, the obtained indication may specify to the storage system 102 that when a particular threshold value associated with a particular I/O tag is met, a snapshot will automatically be generated for the logical volumes associated with the application or virtual machine corresponding to the I/O tag, a snapshot will automatically be generated for one or more additional logical volumes in the storage system 102 in addition to those logical volumes associated with the application or virtual machine corresponding to the I/O tag, a snapshot will automatically be generated for all of the logical volumes or a snapshot will automatically be generated for any other portion of the logical volumes of the storage system 102.

In some embodiments, the I/O tags may be categorized into a number of different types, for example, depending on the criticality of the corresponding application or virtual machine. For example, threshold values for each type may be obtained by the storage system 102. For example, one or more of the data structures of FIGS. 3-5 may be obtained by the storage system 102, e.g., from a user or the host device 101, which indicates the types of the I/O tag, the corresponding thresholds for each I/O tag or any other information.

In some embodiments, the threshold value may be tied to the criticality of the corresponding application or virtual machine where, for example, a different threshold value may be provided for each criticality level. As an example, a very high criticality level may have a threshold value of X to trigger a snapshot, a high criticality level may have a threshold value of 2X to trigger a snapshot, a medium criticality level may have a threshold value of 3X to trigger a snapshot, a low criticality level may have a threshold value of 4X to trigger a snapshot and any other criticality level may have any other threshold value to trigger a snapshot. X may be any value appropriate for use in a storage system such as, e.g., 1G.

In some embodiments, for example, where an application or virtual machine does not have a corresponding criticality level, e.g., the application or virtual machine does not have any particular priority, a threshold value may not be included. In such a case, the storage-side I/O tag processing logic 124 will not trigger a snapshot based on the amount of data written to the storage devices 106 for I/O operations having the I/O tag corresponding to that application or virtual machine regardless of how much data is written.

FIG. 6A illustrates exemplary pseudo code for a server-side I/O tagging process 600, according to at least some embodiments. The exemplary server-side I/O tagging process 600 may be implemented, for example, by the server-side I/O tagging logic 116 of FIG. 1. As shown in FIG. 6A, for each I/O operation issued by an application 112 or virtual machine 210, the server-side I/O tagging logic 116 uses the source-to-I/O tag mapping table 118 to obtain the I/O tag for the application 112 or virtual machine 210. Thereafter, the MPIO driver 114, embeds the I/O tag into the I/O operation as described above and sends the I/O operation with the embedded I/O tag to the storage system 102. As an example, host device I/O stack drivers may be configured to modify a portion of the communication protocol header to embed the I/O tag. In one example, SCSI or NVMe command data blocks (CDB) may have reserved fields in which the application or virtual machine specific I/O tag may be embedded.

The MPIO driver 114 on the host device 101 submits I/O operations having these embedded I/O tags to the storage system 102. In some embodiments, the mappings between the application names or virtual machine UUIDs and the corresponding I/O tag may be provided to the storage system 102. For example, the host device 101 may provide the mapping via a REST command, a SCSI proprietary command or in any other manner. In some embodiments, the mappings between the application names or virtual machine UUIDs and the corresponding criticality may also be provided to the storage system 102, for example, via the REST command, SCSI proprietary command or in any other manner.

FIG. 6B illustrates exemplary pseudo code for a storage-side I/O tag processing routine 650, according to at least some embodiments. The exemplary storage-side I/O tag processing routine 650 may be implemented, for example, by the storage-side I/O tag processing logic 124 of FIG. 1. As shown in FIG. 6B, when the storage system 102 receives an I/O operation from the representative host device 101-1, the storage system 102 may obtain the unique I/O tag from the I/O operation. In illustrative embodiments, the storage system 102 may maintain a cumulative value (e.g., an amount of data) associated with I/O operations having the same I/O tag (e.g., I/O operations issued by the same application or virtual machine). For example, the cumulative value may comprise a cumulative sum of the amount of data of I/O operations submitted to the storage system 102 for the application or virtual machine corresponding to the I/O tag. In some embodiments, the cumulative value may comprise a cumulative number of I/O operations that are submitted to the storage system 102 that have the same I/O tag.

The storage system 102 may be configured to automatically trigger a snapshot based at least in part on the cumulative value associated with an I/O tag, relative to the threshold value indicating in the storage-side I/O tag data structure of FIG. 5. The cumulative value for an I/O tag may be reset by the storage system 102 each time a snapshot is taken of at least the portion of the storage system that is associated with the application or VM corresponding to the I/O tag, e.g., those portions of the storage system that comprise the data used by the application or VM.

For example, if the cumulative value associated with an I/O tag meets a particular threshold value, a snapshot may be triggered by the storage system. In some embodiments, the snapshot may comprise any portion of the storage system 102 that stores data for the application or virtual machine associated with the I/O tag. In some embodiments, the snapshot may comprise portions of the storage system 102 in addition to those portions that store data for the application or virtual machine associated with the I/O tag. In some embodiments, the snapshot may comprise all of the data stored on the storage system 102.

The threshold value for the I/O tag may be set or obtained by the storage system 102, for example, from a user input, from the representative host device 101-1 or in any other manner. As an example, an administrator of the storage system 102 may set the threshold value for an I/O tag, a user of the host device 101 may submit the threshold value to the storage system 102 associated with an I/O tag or the threshold value may be determined in any other matter. In some embodiments, each I/O tag may have a separate application or virtual machine specific threshold value. In some embodiments, the I/O tags may be classified into one or more types, for example, based on a type of application or virtual machine, criticality or priority of the application or virtual machine or for any other reason, and threshold values may be assigned to each type of I/O tag such that each I/O tag in a given type has the same threshold value.

In one particular implementation, the pseudo code for a storage-side I/O tag processing routine 650, in response to the receipt of an I/O operation from the host device 101, may comprise:

1. For each I/O operation, the storage-side I/O tag processing logic 124 obtains the embedded I/O tag, for example, from the SCSI or NVMe CDB and also determines an amount of data that is being written by the I/O operation;
2. The storage-side I/O tag processing logic 124 adds the determined amount of data to the amount of data field in FIG. 5 for the I/O tag entry;
3. The storage-side I/O tag processing logic 124 determines whether or not the amount of data field comprises an amount of data that meets the threshold value for the I/O tag; and
4. The storage-side I/O tag processing logic 124 triggers the snapshot layer 126 to perform a snapshot based at least in part on a determination that the amount of data field comprises an amount of data that meets the threshold value for the I/O tag. In some embodiments, the amount of data in the amount of data field may be reset in conjunction with the triggering of the snapshot.

FIG. 7 is a flow chart illustrating an exemplary implementation of a snapshot creation process 700 that uses source tagging of I/O operations, according to an exemplary embodiment of the disclosure. As shown in FIG. 7, the exemplary snapshot creation process 700 initially receives an I/O operation during step 702 and then obtains an I/O tag associated with the I/O operation during step 704 indicating a source of the I/O operation (e.g., an application or a virtual machine). In some embodiments, a source device associated with the I/O operation associates the I/O tag with the I/O operation and sends the I/O operation with the I/O tag to the storage system 102.

Thereafter, the snapshot creation process 700 updates a cumulative I/O tag value associated with the I/O tag during step 706 that indicates an amount of activity associated with the I/O tag. Finally, the snapshot creation process 700 initiates a snapshot of at least a portion of a storage system 102 that stores data associated with the I/O operation in response to the cumulative I/O tag value satisfying a corresponding threshold value in step 708. As noted above, the snapshot may be, for example, a snapshot of a portion of the storage system 102 that stores data for the source of the I/O operation and a full snapshot of the storage system 102 (or anywhere in between).

In some embodiments, the amount of activity associated with the I/O tag, as processed during step 706, indicates a cumulative sum of an amount of data associated with at least some of the I/O operations having the I/O tag and/or a cumulative number of at least some of the I/O operations having the I/O tag.

After the snapshot creation process 700 initiates the snapshot during step 708, the cumulative I/O tag value may be reset in some embodiments.

In one or more embodiments, the corresponding threshold value for the I/O tag that is processed during step 708 is based at least in part on; a specific value for the source of the I/O operation, a type of the source of the I/O operation, a criticality of the source of the I/O operation and/or a priority of the source of the I/O operation.

The particular processing operations and other network functionality described in conjunction with the flow diagram of FIG. 7 are presented by way of illustrative example only, and should not be construed as limiting the scope of the disclosure in any way. Alternative embodiments can use other types of processing operations to selectively create snapshots using source tagging of I/O operations. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

By utilizing the above-described I/O tag-based snapshot techniques, snapshots are automatically generated selectively based on the I/O operation activity of a particular application or virtual machine. In addition, by utilizing a threshold value for I/O operations submitted in association with a particular I/O tag, snapshots may be generated for the data associated with the application or virtual machine corresponding to the particular I/O tag that are based on actual data and/or operation throughput to the storage system 102 rather than predetermined periods of time or other similar benchmarks.

In illustrative embodiments, the disclosed functionality for I/O tag-based snapshots creates snapshots based on an estimate of the amount of data that is added to and/or changed in the storage system 102 by I/O operations submitted by a particular application or virtual machine. In some embodiments, the I/O tag-based snapshots may be created based on the number of I/O operations by a particular application or virtual machine that write data to the storage system 102.

In conjunction with the submission of an I/O operation, an application or virtual machine specific I/O tag is embedded into the I/O operation by server-side I/O tagging logic 116 and/or the MPIO driver 114 or another portion of the host device 101. When the I/O operation is received by the storage system 102, the storage system 102 decodes the I/O tag, for example, using storage-side I/O tag processing logic 124.

The disclosed techniques allow snapshots to be created by the storage system 102 on a per application or per virtual machine basis, as needed. The snapshots are triggered based on the amount of data that each application or virtual machine has submitted to the storage system 102 which is determined through the use of I/O tagging. In some cases, the snapshots may be triggered only for data that is associated with the relevant application or virtual machine. In other cases, the snapshots may be triggered for the relevant application or virtual machine but may include data associated with one or more other applications or virtual machines. The snapshots are triggered when a threshold value is met which may be specific to the particular application or virtual machine and in some cases may be determined based on a criticality associated with the application or virtual machine.

These features allow the storage system 102 to provide efficient and targeted snapshotting of data based on actual usage by applications or virtual machines which ensures that the relevant data for an application or virtual machine is being snapshotted in a timely manner while inhibiting the waste of system resources on unnecessary schedule-based snapshots.

One or more embodiments of the disclosure provide improved methods, apparatus and computer program products for selective snapshot creation using source tagging of I/O operations. The foregoing applications and associated embodiments should be considered as illustrative only, and numerous other embodiments can be configured using the techniques disclosed herein, in a wide variety of different applications.

It should also be understood that the disclosed tag-based snapshot creation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for selective snapshot creation using source tagging of I/O operations may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based tag-based snapshot creation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based tag-based snapshot creation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
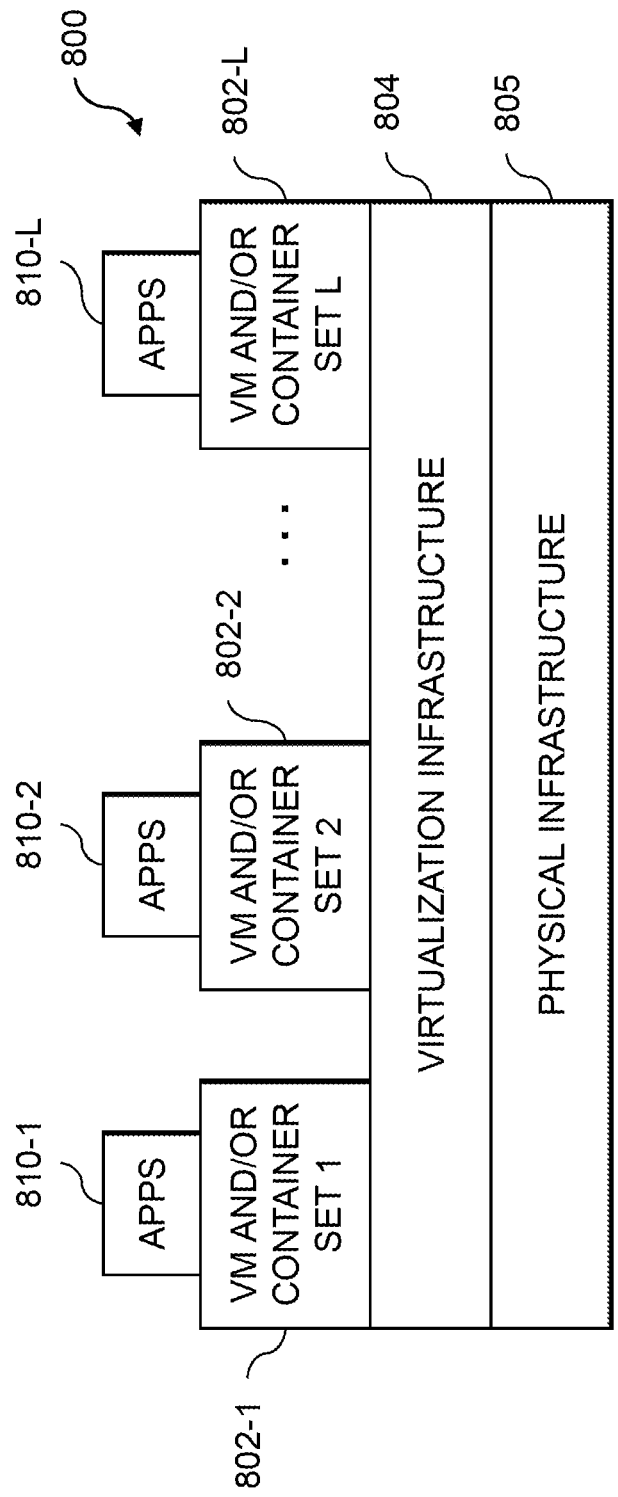
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple VMs and/or container sets 802-1, 802-2, ... 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, ... 810-L running on respective ones of the VMs/container sets 802-1, 802-2, ... 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide tag-based snapshot creation functionality of the type described above for one or more processes running on a given one of the VMs. For example, each of the VMs can implement tag-based snapshot creation control logic and associated source-to-I/O tag mapping tables for providing tag-based snapshot creation functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide tag-based snapshot creation functionality of the type described above for one or more processes running on different ones of the containers. For example, a container host device supporting multiple containers of one or more container sets can implement one or more instances of tag-based snapshot creation control logic and associated source-to-I/O tag mapping tables for use in implementing tag-based snapshots.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, ... 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
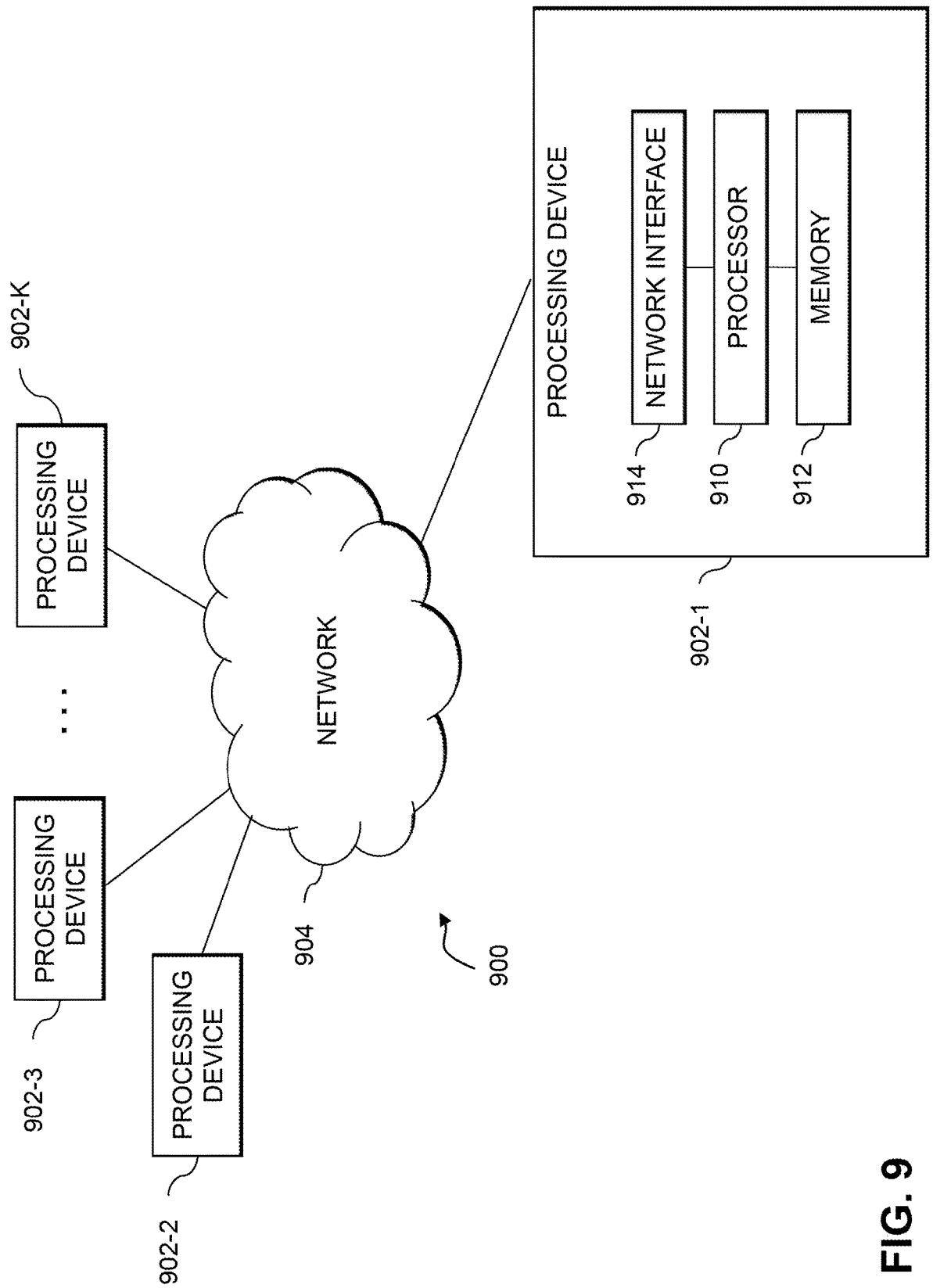
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
receiving, by a storage system, a plurality of I/O operations, wherein a respective one of the I/O operations has an associated I/O tag that was associated with the respective I/O operation by a source device of the respective I/O operation and indicates the source device of the respective I/O operation;
obtaining, by the storage system, the I/O tag associated with the respective I/O operation indicating the source device of the respective I/O operation, wherein the source device of the respective I/O operation sends the respective I/O operation with the I/O tag to the storage system;
updating, by the storage system, a cumulative I/O tag value associated with the I/O tag that indicates an amount of activity associated with the I/O tag; and
initiating, by the storage system, a snapshot of at least a portion of the storage system that stores data associated with the respective I/O operation in response to the cumulative I/O tag value satisfying a corresponding threshold value;
wherein the method is performed by at least one processing device comprising a processor coupled to a memory.

2. The method of claim 1, wherein the amount of activity associated with the I/O tag indicates one or more of a cumulative sum of an amount of data associated with at least some of the I/O operations having the I/O tag and a cumulative number of at least some of the I/O operations having the I/O tag.

3. The method of claim 1, wherein the source of the respective I/O operation comprises one or more of a source application and a source virtual machine.

4. The method of claim 1, wherein the initiating further comprises resetting the cumulative I/O tag value.

5. The method of claim 1, wherein the corresponding threshold value for the I/O tag is based at least in part on one or more of a specific value for the source of the respective I/O operation, a type of the source of the respective I/O operation, a criticality of the source of the respective I/O operation and a priority of the source of the respective I/O operation.

6. The method of claim 1, wherein the snapshot comprises one or more of a snapshot of at least a portion of the storage system that stores data for the source of the respective I/O operation and a full snapshot of the storage system.

7. The method of claim 1, wherein the source device associates an I/O tag with each of the plurality of I/O operations and sends each of the plurality of I/O operations with the corresponding I/O tag to the storage system.

8. An apparatus comprising:
at least one processing device comprising a processor coupled to a memory;
the at least one processing device being configured to implement the following steps:
receiving, by a storage system, a plurality of I/O operations, wherein a respective one of the I/O operations has an associated I/O tag that was associated with the respective I/O operation by a source device of the respective I/O operation and indicates the source device of the respective I/O operation;
obtaining, by the storage system, the I/O tag associated with the respective I/O operation indicating the source device of the respective I/O operation, wherein the source device of the respective I/O operation sends the respective I/O operation with the I/O tag to the storage system;

updating, by the storage system, a cumulative I/O tag value associated with the I/O tag that indicates an amount of activity associated with the I/O tag; and initiating, by the storage system, a snapshot of at least a portion of the storage system that stores data associated with the respective I/O operation in response to the cumulative I/O tag value satisfying a corresponding threshold value.

9. The apparatus of claim 8, wherein the amount of activity associated with the I/O tag indicates one or more of a cumulative sum of an amount of data associated with at least some of the I/O operations having the I/O tag and a cumulative number of at least some of the I/O operations having the I/O tag.

10. The apparatus of claim 8, wherein the source of the respective I/O operation comprises one or more of a source application and a source virtual machine.

11. The apparatus of claim 8, wherein the initiating further comprises resetting the cumulative I/O tag value.

12. The apparatus of claim 8, wherein the corresponding threshold value for the I/O tag is based at least in part on one or more of a specific value for the source of the respective I/O operation, a type of the source of the respective I/O operation, a criticality of the source of the respective I/O operation and a priority of the source of the respective I/O operation.

13. The apparatus of claim 8, wherein the snapshot comprises one or more of a snapshot of at least a portion of the storage system that stores data for the source of the respective I/O operation and a full snapshot of the storage system.

14. The apparatus of claim 8, wherein the source device associates an I/O tag with each of the plurality of I/O operations and sends each of the plurality of I/O operations with the corresponding I/O tag to the storage system.

15. A non-transitory processor-readable storage medium having stored therein program code of one or more software programs, wherein the program code when executed by at least one processing device causes the at least one processing device to perform the following steps:

receiving, by a storage system, a plurality of I/O operations, wherein a respective one of the I/O operations has an associated I/O tag that was associated with the respective I/O operation by a source device of the respective I/O operation and indicates the source device of the respective I/O operation;

obtaining, by the storage system, the I/O tag associated with the respective I/O operation indicating the source device of the respective I/O operation, wherein the source device of the respective I/O operation sends the respective I/O operation with the I/O tag to the storage system;

updating, by the storage system, a cumulative I/O tag value associated with the I/O tag that indicates an amount of activity associated with the I/O tag; and initiating, by the storage system, a snapshot of at least a portion of the storage system that stores data associated with the respective I/O operation in response to the cumulative I/O tag value satisfying a corresponding threshold value.

16. The non-transitory processor-readable storage medium of claim 15, wherein the amount of activity associated with the I/O tag indicates one or more of a cumulative sum of an amount of data associated with at least some of the I/O operations having the I/O tag and a cumulative number of at least some of the I/O operations having the I/O tag.

17. The non-transitory processor-readable storage medium of claim 15, wherein the initiating further comprises resetting the cumulative I/O tag value.

18. The non-transitory processor-readable storage medium of claim 15, wherein the corresponding threshold value for the I/O tag is based at least in part on one or more of a specific value for the source of the respective I/O operation, a type of the source of the respective I/O operation, a criticality of the source of the respective I/O operation and a priority of the source of the respective I/O operation.

19. The non-transitory processor-readable storage medium of claim 15, wherein the snapshot comprises one or more of a snapshot of at least a portion of the storage system that stores data for the source of the respective I/O operation and a full snapshot of the storage system.

20. The non-transitory processor-readable storage medium of claim 15, wherein the source device associates an I/O tag with each of the plurality of I/O operations and sends each of the plurality of I/O operations with the corresponding I/O tag to the storage system.

* * * * *